United States Patent [19]
Becker et al.

[11] 3,934,486
[45] Jan. 27, 1976

[54] SAFETY STEERING COLUMN

[75] Inventors: Burkhardt Becker; Heinz Wallach, both of Wolfsburg; Rainer Heise, Wolfsburg-Neuhaus, all of Germany

[73] Assignee: Volkswagenwerk Aktiengesellschaft, Wolfsburg, Germany

[22] Filed: July 5, 1974

[21] Appl. No.: 486,074

[30] Foreign Application Priority Data
July 19, 1973 Germany............................ 2336788

[52] U.S. Cl. .................................. 74/492; 64/15 B
[51] Int. Cl.² ...................... G05G 1/08; F16D 3/56
[58] Field of Search ............ 74/492, 493; 64/12, 13, 64/15 R, 15 B, 27 B

[56] References Cited
UNITED STATES PATENTS

| | | | |
|---|---|---|---|
| 1,214,307 | 1/1917 | Hosford | 64/15 B |
| 1,392,342 | 10/1921 | Laycock | 64/15 R X |
| 2,591,769 | 4/1952 | Beechler | 64/15 B |
| 3,028,766 | 4/1962 | Musilli | 74/492 |
| 3,611,750 | 10/1971 | Gasior | 64/15 R |

FOREIGN PATENTS OR APPLICATIONS

| | | | |
|---|---|---|---|
| 570,282 | 1/1933 | Germany | 64/15 B |
| 1,932,597 | 6/1969 | Germany | 74/492 |

Primary Examiner—Allan D. Hermann
Attorney, Agent, or Firm—Brumbaugh, Graves, Donohue & Raymond

[57] ABSTRACT

A safety steering column for a vehicle comprises a rotatable composite shaft extending between the steering wheel assembly and the steering gear assembly for the vehicle. The composite shaft is divided intermediate its ends into two shaft parts and a relatively torsion-stiff joint couples adjacent ends of the two shaft parts. Two more relatively torsion-stiff joints couple opposite ends of the composite shaft to the steering wheel assembly and the steering gear assembly, respectively. The joint coupling together the two parts of the composite shaft is constructed to provide a pivot point radially offset from the central longitudinal axes of the shaft parts. Accordingly, upon application of an axial load on the composite shaft exceeding a predetermined axial load, the shaft parts will pivot relative to each other about the pivot point and the composite shaft will tend to buckle at the joint coupling the two parts of the shaft.

6 Claims, 6 Drawing Figures

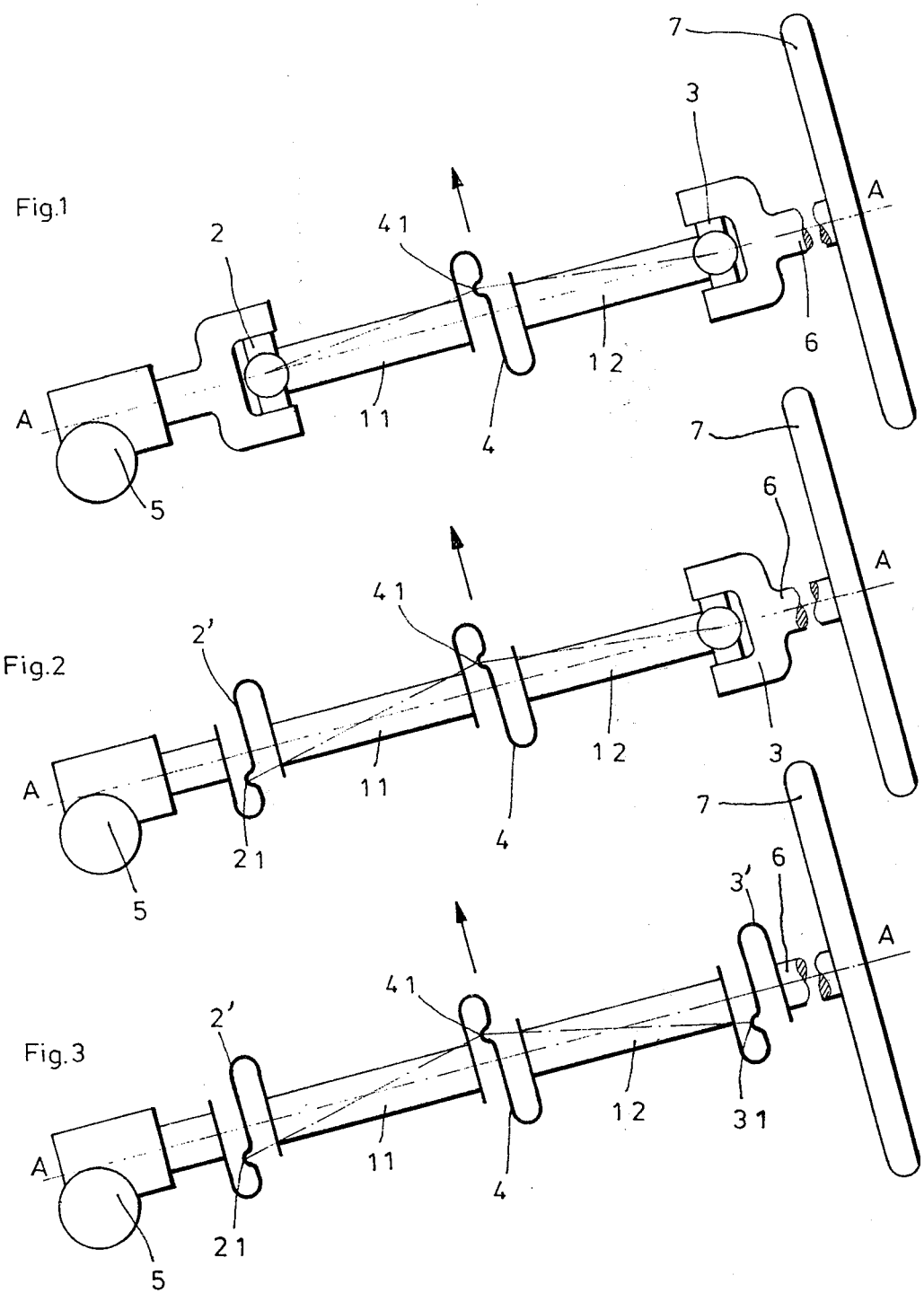

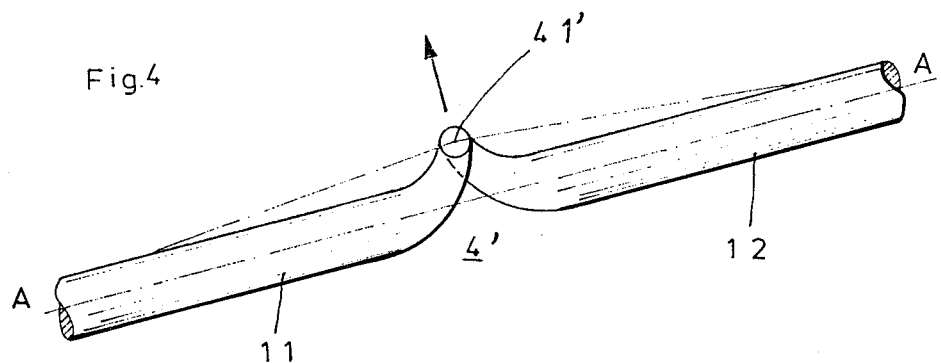
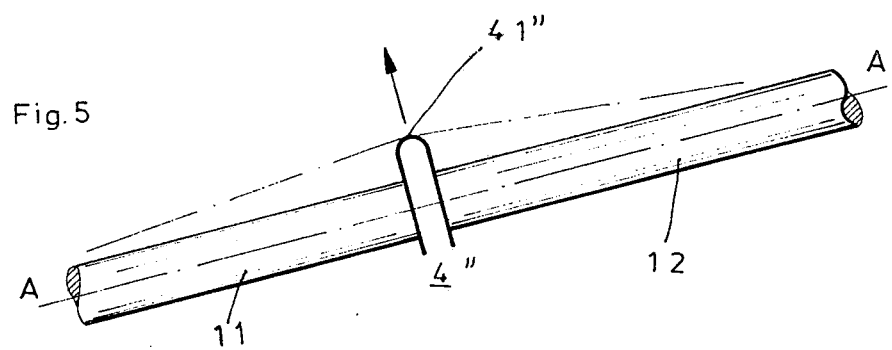
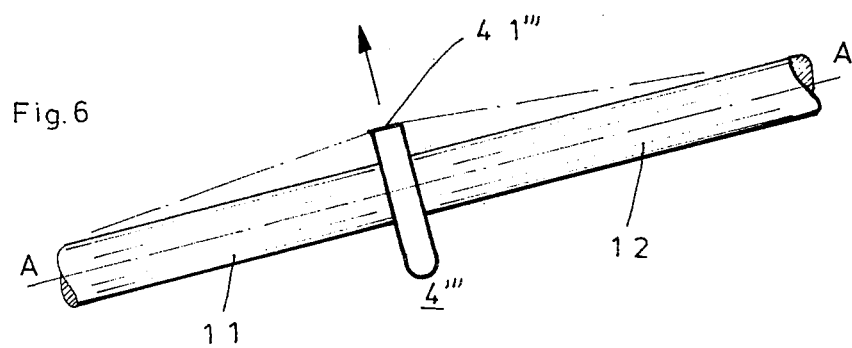

SAFETY STEERING COLUMN

BACKGROUND OF THE INVENTION

In a collision involving a vehicle, such as an automobile, particularly in a serious head-on collision, the steering column that operatively couples the steering wheel assembly to the steering gear assembly and the axle for the front wheels, for example, may be forced into the passenger compartment of the vehicle due to the deformation of the front of the vehicle body. In order to avoid serious injuries to the operator of a vehicle resulting from the steering column being forced into the passenger compartment, steering columns have been proposed that are constructed in two parts capable of moving axially relative to one another. In a collision, therefore, such two-part steering columns can accommodate significant deformation of the front portion of a vehicle body without significant movement of the column into the passenger compartment.

In one type of a two-part steering column, one part of the column is hollow and has a larger diameter than the other part. Upon the application of an axial impact load, the part of the column having the smaller diameter telescopes into the part having the larger diameter. Such a two-part steering column is described and illustrated in Bogosoff et al. U.S. Pat. No. 3,394,612, for example.

In another type of a two-part steering column, the two parts of the column are separated and the resulting gap is bridged by a shock absorbing element. Two part steering columns of the second type are described and illustrated in Orlich et al. U.S. Pat. No. 3,482,466, German Patentschrift No. 1,298,010 and German Auslegeschrift No. 1,655,581. In a particular embodiment of a two-part steering column that includes an intermediate shock absorber portion, the opposite ends of the column are coupled to the steering wheel shaft and to a steering gear assembly by joints, such as universal joints, that are relatively torsion-stiff. During a frontal collision, the steering column deforms into a lightning-like shape. The construction of such a steering column is described and illustrated in the bi-weekly German magazine "Mot", at pages 50 and 52 of the Oct. 19, 1968 issue.

SUMMARY OF THE INVENTION

The present invention is directed to a safety steering column for a vehicle, such as an automobile, which utilizes a two-part construction and is designed to buckle in the event of an accident, in a controlled direction away from the driver of the vehicle to avoid injuries, including foot and leg injuries. According to the invention, a safety steering column comprises a rotatable composite shaft extending between the steering wheel assembly for a vehicle and the steering gear assembly. The shaft is divided intermediate its ends into two parts and adjacent ends of the two shaft parts are coupled together by a relatively torsion-stiff joint. A second and a third relatively torsion-stiff joint couple opposite ends of the composite shaft to the steering wheel assembly and the steering gear assembly, respectively. The torsion-stiff joint that couples together the two parts of the composite shaft is constructed to provide a pivot point radially offset from the central longitudinal axes of the shaft parts. As a result, upon application of an axial load on the shaft exceeding a predetermined axial load, relative pivotal movement between the shaft parts about the pivot point will result and the composite shaft will tend to buckle at the first joint in the direction of the pivot point.

A safety steering column according to the invention may be constructed so that either one or both of the second and third torsion-stiff joints are constructed to provide additional pivot points about which adjacent shaft parts can pivot. The additional pivot points are radially offset from the central longitudinal axes of the parts of the composite shaft and are located on sides of the axes opposite the pivot point of the first joint coupling the two shaft parts together. Such a construction enhances the tendency of the steering column to buckle in the direction of the pivot point of the first torsion-stiff joint.

Torsion-stiff joints that provide pivot points, according to the invention, are preferably constructed of S-shaped metal members having three generally linear portions connected in series by two curved portions. In the first or middle torsion-stiff joint, for example, the two parts of the composite shaft are coupled to different ones of the two outer linear portions of the S-shaped metal member. An indentation is formed in the central linear portion of the metal member, at a position radially offset from the central longitudinal axes of the shaft parts, so as to function as a pivot point on the application of a critical impact load on the composite shaft.

The joints may also be constructed as hinges or of U-shaped metal members having two legs and a curved connecting portion joining adjacent ends of the legs. In a joint having a U-shaped member, the two parts of the composite shaft, for example, are coupled to different legs of the member and the pivot point is located in the curved connecting portion of the member. The free end of one leg of the U-shaped member can be configured to extend toward and bear on the other leg of the member and may be spot welded to the other leg in order to insure that relative lateral movement of the legs does not occur.

BRIEF DESCRIPTION OF THE DRAWINGS

For a better understanding of the invention, reference may be made to the following description of several exemplary embodiments, taken in conjunction with the accompanying drawings, in which:

FIG. 1 is a diagrammatic view of a safety steering column according to the present invention, utilizing one embodiment of a relatively torsion-stiff joint according to the invention;

FIG. 2 is a diagrammatic view of a second embodiment of a safety steering column according to the invention;

FIG. 3 is a diagrammatic view of a third embodiment of a safety steering column according to the invention;

FIG. 4 is a diagrammatic view of a second embodiment of a relatively torsion-stiff joint according to the invention;

FIG. 5 is a diagrammatic view of a third embodiment of a relatively torsion-stiff joint according to the invention; and FIG. 6 is a diagrammatic view of a fourth embodiment of a relatively torsion-stiff joint according to the invention.

DESCRIPTION OF EMBODIMENTS

FIG. 1 of the drawings illustrates a part of a steering train for a vehicle, such as an automobile. Beginning at the right hand side of FIG. 1, the steering train comprises a steering wheel assembly that includes a steering wheel 7 and a stub shaft 6 journaled on the automobile frame. The stub shaft 6 extends from the steering wheel 7 to a universal joint 3 that couples the stub shaft to one part 12 of a rotatable composite steering shaft. The universal joint 3 is relatively torsion-stiff, having a high resistance to torsion induced strain, which facilitates efficient transfer of rotational movement of the steering wheel 7 to the following parts of the steering train.

The rotatable shaft part 12 is coupled by a joint 4, which is relatively torsion-stiff, like the universal joint 3, and is discussed below in detail, to a second part 11 of the composite steering shaft. The central longitudinal axes of the two shaft parts 11 and 12 are substantially aligned and together define a central longitudinal axis A—A for the composite steering shaft. The other end of the second part 11 of the steering shaft is coupled by a second universal joint 2, which is also relatively torsion-stiff, to a conventional steering gear assembly. The steering gear assembly, including a steering gear 5, is connected in any conventional manner to the axle (not shown) for the front wheels, for example, of the automobile so that rotational movement of the steering wheel 7 is reflected in a related change in the orientation of the automobile wheels (not shown).

The relatively torsion-stiff joint 4 that couples together adjacent ends of the two shaft parts 11 and 12 is formed by a generally S-shaped member fabricated of a strip of sheet metal. The metal member or shackle includes three generally parallel and linear portions that are connected together in series by two curved portions to give the member its overall S-shape. As shown in FIG. 1, the outer linear sections of the S-shaped member are welded, for example, to the adjacent ends of the shaft part 11 and the shaft part 12, respectively. The central linear portion of the S-shaped member has an indentation or corrugation 41 that is radially offset from the central longitudinal axis A—A of the composite rotatable steering shaft.

In the event of a head-on collision involving the automobile in which the steering train of FIG. 1 is used, any axially directed force or load exerted on the composite steering shaft tends to compress the joint 4 so that the linear portions of the S-shaped member move toward each other. During such compression of the joint 4, however, the indentation or corrugation 41 contacts the adjacent linear portion of the S-shaped member before any other contact is made between the various linear portions of the member. As a result, the corrugation 41 functions as a pivot point or fulcrum about which the remainder of the S-shaped member pivots together with the two shaft parts 11 and 12. Since the two shaft parts 11 and 12 are then no longer merely moving toward each other but are beginning to pivot about a point offset from the central longitudinal axis of the composite steering shaft, the composite shaft tends to buckle in the direction of the corrugation 41, as indicated by the arrow in FIG. 1.

In order to obtain the maximum advantage from the invention, the pivot point should be located so that the buckling of the composite steering shaft is away from the legs and feet of a driver of the automobile, which would ordinarily be located below the steering train as illustrated in FIG. 1. The pivot point could also be oriented so that the buckling of the composite steering shaft would be in a direction into or out of the plane of FIG. 1. In order to insure that the composite steering shaft does not buckle in non-emergency situations, the S-shaped member of the joint 4 is constructed to resist collapsing or compressing under axial loads on the composite shaft up to a predetermined maximum axial load. The predetermined maximum axial load should preferably be no greater than the axial load expected in a typical front end collision.

If the construction of the automobile permits, one or both of the universal joints 2 and 3 can be replaced by joints similar to joint 4, as illustrated in FIGS. 2 and 3. In FIGS. 2 and 3, reference numerals corresponding to the reference numerals of FIG. 1 have been used to designate corresponding parts of the steering train. The lower universal joint 2 of FIG. 1 is replaced, in FIG. 2, with a torsion-stiff joint 2' similar in construction to the torsion-stiff joint 4, while in FIG. 3, both the upper and lower universal joints 2 and 3 of FIG. 1 are replaced with joints 2' and 3' similar in construction to joint 4. As can be seen from FIGS. 2 and 3, the pivot points 21 and 31 defined by the S-shaped metal members of joints 2' and 3', respectively, are located on the side of the central longitudinal axis A—A of the composite steering shaft opposite the pivot point 41 of the joint 4 to insure buckling of the composite steering shaft in the direction of the arrows in FIGS. 2 and 3.

The S-shaped joint member illustrated in FIGS. 1–3 of the drawings is relatively simple in structure and can be produced quite economically. Nonetheless, the S-shaped member insures that the desired result of the invention can be achieved. FIGS. 4–6 of the drawings illustrate other relatively torsion-stiff joints that may be utilized in the invention.

In FIG. 4, the central joint 4' of the composite steering shaft is constructed like a hinge having its pivot point or hinge pin 41' radially offset from the longitudinal axis A—A of the shaft. The joint 4' is a compression joint in which the hinge pin 41' is bolt. By tightening the bolted connection, the joint 4' is made relatively resistant to pivotal movement so that buckling of the composite shaft does not occur until a critical axial load is applied on the shaft.

The central torsion-stiff joint 4'', in FIG. 5, comprises a U-shaped member fabricated of a sheet metal strip. Adjacent ends of the two shaft parts 11 and 21 are welded, for example, to different legs of the U-shaped member. The curved portion of the U-shaped member, which connects the two legs, acts as the pivot point or fulcrum of the joint 4''. Since the apex of the U-shaped member is radially offset from the longitudinal axis A—A of the composite steering shaft, the shaft will buckle in the direction of the arrow in FIG. 5 under an axial load exceeding a predetermined maximum axial load. The extent to which the composite steering shaft can buckle outward in the embodiment of FIG. 5, however, is somewhat shorter than the extent of buckling possible with the embodiments of FIGS. 1–3, unless the U-shaped member is enlarged relative to the S-shaped member of FIGS. 1–3.

FIG. 6 of the drawings illustrates a central torsion-stiff joint 4''' having a U-shaped metal member generally similar to the U-shaped member of the joint 4'' in FIG. 5. The end of one of the legs of the U-shaped member in FIG. 6 is bent towards the other leg of the member and bears on the other leg. The bent-over end of the leg may be connected to the other leg by light spot welding to insure against lateral displacement and to increase the torsional stiffness of the joint 4'''. Since the curved connecting or apex portion of the U-shaped member is radially offset farther from the central longitudinal axis A—A of the composite steering shaft than the welded ends of the legs of the U-shaped member, the point at which the two ends are welded together acts as the pivot point or fulcrum 41''' in the embodiment of FIG. 6.

Although the joints 4', 4'' and 4''' in FIGS. 4–6 have been illustrated as replacing the central torsion-stiff 4 of FIGS. 1–3, they may also replace the universal joints 2 and 3 of FIG. 1 or the joints 2' and 3' of FIGS. 2 and 3. The metal members of the joints 4 and 41'' in FIGS. 1–3 and in FIG. 5, respectively, can be used in a composite steering shaft to compensate for alignment differences resulting from the mounting tolerances of the various portions of the steering train. For example, the metal members 4 and 41'' can be used to couple two shaft parts 11 and 12 that are not precisely aligned because the legs or linear portions of the members need not lie precisely parallel to one another.

It will be understood that the above described embodiments are merely exemplary and that persons skilled in the art may make many variations and modifications without departing from the spirit and scope of the invention. All such modifications and variations are intended to be within the scope of the invention as defined in the appended claims.

We claim:

1. A safety steering column for a vehicle having a steering wheel assembly and a steering gear assembly comprising a rotatable composite shaft extending between the steering wheel assembly and the steering gear assembly, the composite shaft being divided intermediate its ends into two shaft parts, a first relatively torsion-stiff joint coupling adjacent ends of the two shaft parts, and second and third relatively torsion-stiff joints coupling opposite ends of the composite shaft to the steering wheel assembly and the steering gear assembly, respectively, wherein at least the first joint includes an S-shaped metal member having three generally linear portions connected in series by two curved portions, an indentation being formed in a central one of the three linear portions of the metal member at a position radially offset from the central longitudinal axes of the shaft parts, the indentation being adapted to function as a first pivot point, the two shaft parts being coupled to different ones of the two outer linear portions of the S-Shaped metal member of the first joint.

2. A safety steering column according to claim 1, wherein one of the second and third joints includes an S-shaped metal member having three generally linear portions connected in series by two curved portions, an indentation being formed in a central one of the three linear portions of the metal member at a position radially offset from the central longitudinal axes of the shaft parts, the indentation being adapted to function as a second pivot point, the first and the second pivot points being located on opposite sides of the central longitudinal axis of the one shaft part.

3. A safety steering column according to claim 1, wherein the second and the third joints include S-shaped metal members each having three generally linear portions connected in series by two curved portions, an indentation being formed in a central one of the three linear portions of the metal member at a position radially offset from the central longitudinal axes of the shaft parts, the indentations being adapted to function as second and third pivot points and being located on sides of the central longitudinal axes opposite the first pivot point.

4. A safety steering column for a vehicle having a steering wheel assembly and a steering gear assembly comprising a rotatable composite shaft extending between the steering wheel assembly and the steering gear assembly, the composite shaft being divided intermediate its ends into two shaft parts, a first relatively torsion-stiff joint coupling adjacent ends of the two shaft parts, and second and third relatively torsion-stiff joints coupling opposite ends of the composite shaft to the steering wheel assembly and the steering gear assembly, respectively, wherein at least the first joint includes a U-shaped metal member having two legs and a connecting portion coupling one end of one leg to the the corresponding end of the other leg, and wherein the other end of the one leg of the U-shaped metal member extends toward and bears on the other leg of the member, thereby providing a first pivot point radially offset from the central longitudinal axes of the shaft parts so that upon application of an axial load on the composite shaft exceeding a predetermined axial load, relative pivotal movement between the shaft parts about the first pivot point will result and the composite shaft will tend to buckle at the first joint.

5. A safety steering column according to claim 4, wherein the other end of the one leg is connected to the other leg by light spot welding.

6. A safety steering column for a vehicle having a steering wheel assembly and a steering gear assembly comprising a rotatable composite shaft extending between the steering wheel assembly and the steering gear assembly, the composite shaft being divided intermediate its ends into two shaft parts, a first relatively torsion-stiff joint coupling adjacent ends of the two shaft parts, and second and third relatively torsion-stiff joints coupling opposite ends of the composite shaft to the steering wheel assembly and the steering gear assembly, respectively, the first joint being constructed to provide a first pivot point radially offset from the central longitudinal axes of the shaft parts so that upon application of an axial load on the composite shaft exceeding a predetermined axial load, relative pivotal movement between the shaft parts about the first pivot point will result, the first pivot point being located so that the composite shaft tends to buckle at the first joint in a direction away from the interior of a passenger compartment for the vehicle.

* * * * *